(12) United States Patent
Asano

(10) Patent No.: US 8,189,215 B2
(45) Date of Patent: May 29, 2012

(54) IMAGE READING DEVICE AND ASSOCIATED METHOD FOR JOB EXECUTION

(75) Inventor: Taiga Asano, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 685 days.

(21) Appl. No.: 12/393,373

(22) Filed: Feb. 26, 2009

(65) Prior Publication Data

US 2009/0237720 A1      Sep. 24, 2009

(30) Foreign Application Priority Data

Mar. 18, 2008  (JP) ................................. 2008-070378
Feb. 5, 2009   (JP) ................................. 2009-025292

(51) Int. Cl.
*G06K 15/00* (2006.01)
*G06F 3/12* (2006.01)

(52) U.S. Cl. ..................... 358/1.14; 358/1.15; 358/1.16; 358/474

(58) Field of Classification Search .................. 358/400, 358/404, 444, 1.16, 474, 1.14, 1.15
See application file for complete search history.

(56) References Cited

U.S. PATENT DOCUMENTS

| | | | |
|---|---|---|---|
| 5,563,986 A | 10/1996 | Suzuki | |
| 6,058,249 A * | 5/2000 | Matsuda et al. | 358/1.14 |
| 6,484,253 B1 * | 11/2002 | Matsuo | 712/212 |
| 6,959,866 B2 | 11/2005 | Takahashi et al. | |
| 2006/0049260 A1 | 3/2006 | Takahashi et al. | |
| 2006/0136828 A1 | 6/2006 | Asano | |
| 2006/0164680 A1 * | 7/2006 | Kim | 358/1.15 |
| 2006/0195495 A1 | 8/2006 | Asano | |
| 2007/0174596 A1 * | 7/2007 | Matsuo | 712/226 |
| 2009/0198908 A1 * | 8/2009 | Arimilli et al. | 711/137 |
| 2009/0222632 A1 * | 9/2009 | Sasage et al. | 711/162 |
| 2011/0013221 A1 * | 1/2011 | Kang et al. | 358/1.15 |

FOREIGN PATENT DOCUMENTS

| | | |
|---|---|---|
| JP | 06-202415 | 7/1994 |
| JP | 07-323641 | 12/1995 |

\* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

An image reading device and associated method for job execution are provided. An interrupted job storage unit of the image reading device is configured to interrupt a first job and to store an interrupted job information that relates to the first job in the storage unit when a job setting initiation sheet that indicates an initiation of a second job is received while the first job is being executed. An interruption job confirmation unit is configured to set the second job as an in-execution job when the job setting initiation sheet is received. An interrupted job reading unit is configured to read the interrupted job information that relates to the first job from the storage unit and to set the first job as the in-execution job when a job setting termination sheet that indicates a termination of the second job is received.

17 Claims, 15 Drawing Sheets

FIG. 7

| JOB ID | USER NAME | EMPLOYEE NUMBER | EMAIL ADDRESS | IP ADDRESS | JOB TYPE | COLOR | BOTH FACES | OUTPUT SETTING |
|---|---|---|---|---|---|---|---|---|
| 222555 | Hanako Kohri | 18023 | hanakokohri@xxx.com | YYY.XXX.7.111 | COPY | TRUE | FALSE | color=true, bothsizes=false, Nup=4, volume=5 |

| INDEX | JOB ID | DIRECTORY | SETTING FILE | PROCEEDING FILE | TEMPORARILY FILE |
|---|---|---|---|---|---|
| 0 | 123456 | /temp/123456/ | 123456.def | 123456.pgr | 0.temp |
| 1 | 345678 | /temp/345678/ | 345678.def | 345678.pgr | 0.temp, 1.temp |

| JOB ID | JOB PRIORITY |
|---|---|
| 123456 | 2 |
| 345678 | 1 |
| 222555 | 5 |

| USER NAME | USER PRIORITY |
|---|---|
| Taroh Ricoh | 2 |
| Hanako Kohri | 1 |
| Jiroh Ricoh | 3 |

| JOB ID | DEGREE OF URGENT |
|---|---|
| 345678 | 5 |
| 222555 | 10 |
| 123456 | 0 |

| JOB ID | PRIORITY INFORMATION | JOB TREATMENT | USER NAME | EMPLOYEE NUMBER | EMAIL ADDRESS | IP ADDRESS | JOB TYPE | COLOR | BOTH FACES | OUTPUT SETTING |
|---|---|---|---|---|---|---|---|---|---|---|
| 222555 | 1 | PRIORITY | Hanako Kohri | 18023 | hanako.kohri@xxx.com | YYY.XXX.7.111 | COPY | TRUE | FALSE | color=true, bothsizes=false, Nup=4, volume=5 |

| INDEX | JOB ID | PRIORITY INFORMATION | JOB TREATMENT | DIRECTORY | SETTING FILE | PROCEEDING FILE | TEMPORARILY FILE |
|---|---|---|---|---|---|---|---|
| 0 | 123456 | 2 | NORMAL | /temp/123456/ | 123456.def | 123456.pgr | 0.temp |
| 1 | 345678 | 2 | POSTPONED-OUTPUT | /temp/345678/ | 345678.def | 345678.pgr | 0.temp, 1.temp |

↙15060

IMAGE READING DEVICE AND ASSOCIATED METHOD FOR JOB EXECUTION

CROSS-REFERENCE TO RELATED APPLICATIONS

This application claims priority under 35 U.S.C. §119(a) to Japanese Patent Application No. 2008-070378, filed on Mar. 18, 2008 in the Japan Patent Office, and Japanese Patent Application No. 2009-025292, filed on Feb. 5, 2009 in the Japan Patent Office, the entire contents of each of which are hereby incorporated by reference herein.

BACKGROUND OF THE INVENTION

1. Field of the Invention

Exemplary embodiments of the present invention relate to an image reading device, a method for job execution of the image reading device, and a computer readable recording medium that stores a program relating to the job execution.

More particularly, the exemplary embodiments relate to an image reading device that performs scanning of original material(s) and executes jobs sequentially based on registered job information, and a method for executing jobs of the same.

2. Description of the Related Art

In the related art, a multi-functional product (MFP) previously registers a job setting and then reads the job setting by selecting at an operation panel of the MFP if it is a required job setting.

For example, Japanese laid open patent JP06-202415 discloses a technique that automatically sets a job setting to the MFP by using a job setting sheet which indicates job setting information. The job setting information includes settings that concern a job that will be done to original materials.

SUMMARY OF THE INVENTION

In one exemplary aspect, an image reading device is provided. The image reading device includes a storage unit configured to store information and an image input unit configured to obtain image data. An interrupted job storage unit is configured to interrupt a first job when a job setting initiation sheet that indicates an initiation of a second job is received while the first job is being executed, and is configured to store an interrupted job information that relates to the first job in the storage unit when the job setting initiation sheet is received. An interruption job confirmation unit is configured to set the second job as an in-execution job when the job setting initiation sheet is received. An interrupted job reading unit is configured to read the interrupted job information that relates to the first job from the storage unit when a job setting termination sheet that indicates a termination of the second job is received, and is configured to set the first job as the in-execution job when the job setting termination sheet is received. A job execution unit is configured to execute the in-execution job with the image data obtained from the image input unit.

In another exemplary aspect, an image reading method is provided. The method includes obtaining image data with an image input unit of an image reading device. Execution of a first job is interrupted when a job setting initiation sheet that indicates an initiation of a second job is received by the image reading device while the first job is being executed by the image reading device. An interrupted job information that relates to the first job is stored in a storage unit. The second job is set as an in-execution job in the image reading device when the job setting initiation sheet is received by the image reading device. The in-execution job is executed in the image reading device with the image data obtained from the image input unit. The interrupted job information that relates to the first job is read from the storage unit when a job setting termination sheet that indicates a termination of the second job is received by the image reading device. The first job is set as the in-execution job in the image reading device.

In another exemplary aspect, an image reading device is provided. The image reading device includes a storage unit configured to store information and an image input unit configured to obtain image data. An interrupted job storage unit is configured to interrupt a first job when a job setting initiation sheet that indicates an initiation of a second job is received while the first job is being executed, and is configured to store an interrupted job information that relates to the first job in the storage unit when the job setting initiation sheet is received. The image reading device also includes means for setting the second job as an in-execution job when the job setting initiation sheet is received; and means for reading the interrupted job information that relates to the first job from the storage unit when a job setting termination sheet that indicates a termination of the second job is received, and for setting the first job as the in-execution job when the job setting termination sheet is received. A job execution unit is configured to execute the in-execution job with the image data obtained from the image input unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a diagram showing an exemplary embodiment of an in-execution job information table;

FIG. 8 is a diagram showing an exemplary embodiment of an interrupted job information table;

FIG. 14(A) to (C) are diagrams showing exemplary embodiments of priority information tables;

FIG. 15 is a diagram showing a second exemplary embodiment of an in-execution job information table;

FIG. 16 is a diagram showing a second exemplary embodiment of an interrupted job information table;

DETAILED DESCRIPTION OF THE PREFERRED EMBODIMENTS

Figure 1:
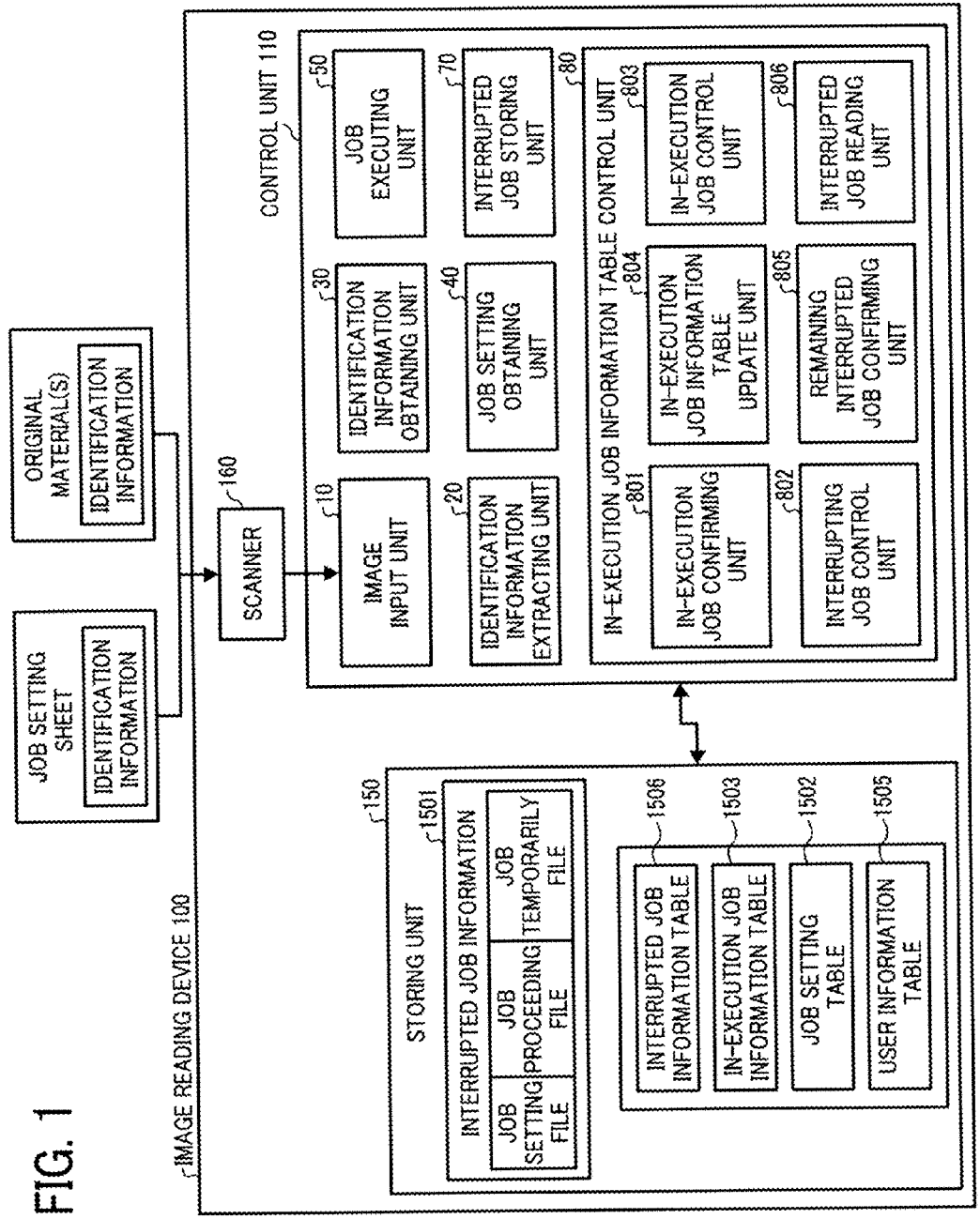
FIG. 1 is a block diagram showing an exemplary operating principle of the image reading device.

Recently, it has become popular to have a multi-functional product (MFP), that includes functions such as scanning, copying, facsimile or the like, perform copying of scanned original material, sending an image data file concerning the scanned original material via e-mail, or the like based on a job setting specified by a user.

As high-end MFP include more functions and become capable of increased speeds, there may be a desire to "go paperless" (reduce waste of paper) to achieve cost reduction and reduction of environmental burdens.

Moreover, curbing the flow of information from paper and/or improving productivity by using electrical information that can excel in information sharing or information retrieval are addressed by the enterprises.

In the meantime, downsizing and price reduction are advanced for office automation equipment and the number of enterprises which afford low-end machine(s) have increased.

In general, image input/output performance of the low-end machine is relatively low, and that could increase operating time. For example, the low-end machine often sacrifices its function because of its price. This forces a user to iteratively operate and set in front of the machine in case different jobs are being executed. If different jobs for different original material(s) are desired, the user needs to set a job to the machine for every original material(s) and every job(s). This forces a user to operate troublesome work.

For example, the technique described in JP06-202415 requires a job that is currently being executed ("current executing job") to be discontinued if a user wishes to interrupt the current executing job with another job which has more priority or emergency. In other words, if the user wishes to finish the current executing job after the job that interrupted the current executing job is done, the user needs to start everything over.

Referring now to the drawings, wherein like reference numerals designate identical or corresponding parts throughout the several views.

An operating principle of an image reading device of an exemplary embodiment of the present invention is explained with reference to FIG. 1. FIG. 1 is a diagram showing an operating principle of the image reading device 100.

The image reading device 100 includes a control unit 110 including an image input unit 10, an identification information extracting unit 20, an identification information obtaining unit 30, a job setting obtaining unit 40, a job executing unit 50, an interrupted job storing unit 70 and an in-execution job information table control unit 80. The image reading device 100 also includes a storing unit 150 and a scanner 160.

The in-execution job information table control unit 80 includes an in-execution job confirming unit 801, an interrupting job control unit 802, an in-execution job control unit 803, an in-execution job information table update unit 804, a remaining interrupted job confirming unit 805 and an interrupted job reading unit 806.

The storing unit 150 stores an interrupted job information 1501 that includes a job setting file, a job proceeding file and a job temporary file. The storing unit 150 also stores a job setting table 1502, an in-execution job information table 1503, a user information table 1505 and an interrupted job information table 1506.

Figure 2:
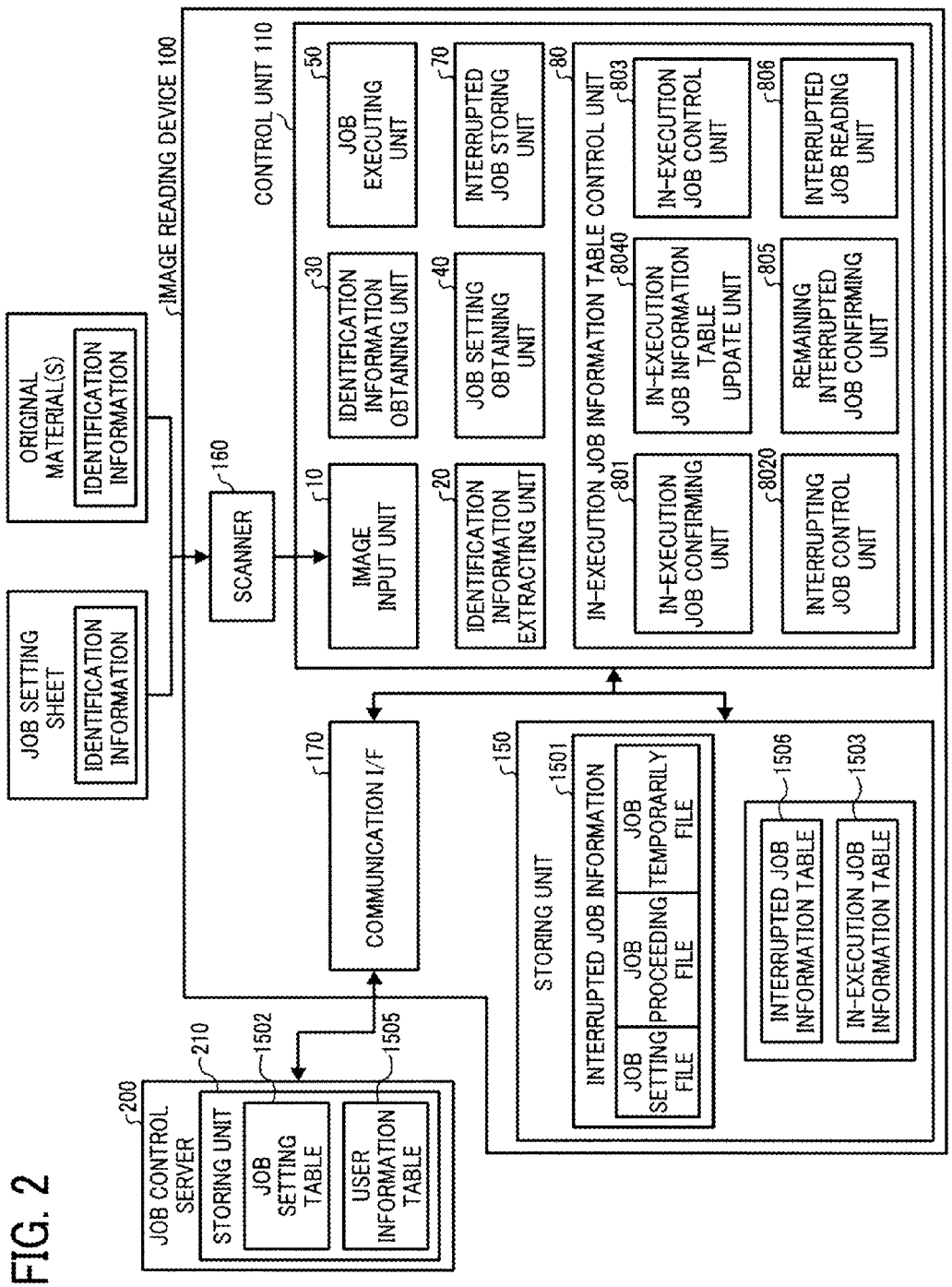
FIG. 2 is a diagram showing another exemplary operating principle of the image reading device.

FIG. 2 is a diagram showing another exemplary operating principle of the image reading device. Referring now to FIG. 2, the image reading device 100 is connected to a job control server 200 via a network connection. In this case, the storing unit 150 of the image reading device stores the interrupted job information 1501, the interrupted job information table 1506 and the in-execution job information table 1503. The job control server 200 includes the storing unit 210 which stores the job setting table 1502 and the user information table 1505.

Figure 3:
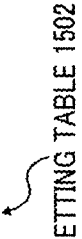
FIG. 3 is a diagram showing an exemplary embodiment of a job setting table.

A brief explanation of the job setting table 1502 stored in the storing unit 150 (FIG. 1) or 210 (FIG. 2) is now provided with reference to FIG. 3. The job setting table 1502 stores a job identification information that identifies a job to be executed by the image reading device 100, a job setting information that indicates a job setting identified by the job identification information and user information that relates to the user(s) who instructs the execution of a process on the image reading device 100. The job setting information and the user information are associated with the job identification information.

The job identification information is obtained by decoding a representational image, such as a barcode or two-dimensional code, which is embedded in the image data. The job identification information is a composite of information such as a number string or a text string. The job identification information need only be in a form that can identify a job being executed by the image reading device 100.

FIG. 3 is a diagram showing an exemplary embodiment of a job setting table. The job identification information (Job ID) and the job setting information are associated with each other and stored by the job setting table 1502 as shown in FIG. 3. With reference to FIG. 3, the user information is also associated with the job identification information. For example, first row of the job setting table 1502, identified by the Job ID: 123456, indicates that the job will entail color scanning of both faces of an original material (job type: scan, both faces: true and color: true), and storing the scanned image data in a folder which path is indicated "/document/taroh/work" in tiff format (format=tiff, savepath=/document/taroh/work). Likewise, the second row of the job setting table, identified by Job ID: 345678, indicates that the job will entail black and white scanning of one face of an original material (job type: copy, both faces: false and color: false), and printing a single blackwhite copy of the scanned image data with the conditions of 2 pages in a paper and +2 output density (color=false, Nup=2, volume=1, density=+2).

The previously mentioned user information includes information that identifies a specific user such as a user name, an employee number, a email address, an IP address or the like. As shown in FIG. 3, the user information is associated with the job identification information and stored in the job setting table 1502. For example, the first row of the job setting table 1502, identified by the Job ID: 123456, indicate the user's name, employee number, email address and IP address (User name: Taroh Ricoh, Employee number: 10011, email address: taroh.ricoh@xxx.com, IP address:YYY.XXX.0.33). The third row of the job setting table 1502, identified by the Job ID: 222555, also includes the user's name, employee number, email address and IP address for that specific job (User name: Hanako Kohri, Employee number: 18023, email address: hanako.kohri@xxx.com, IP address: YYY.XXX.7.111).

The email address or the IP address may be used when the image reading device 100 cannot complete a job because of some failure while the image reading device is running the job. In that case, an email indicating an error notice can possibly be sent to the email address, or a display indicating error can be shown on the terminal which can be identified by the IP address. However, although the present example illustrates the job setting table 1502 in FIG. 3 stores the user information associated with the job identification information, it is also possible to obtain the user information from the user information table 1505 as necessary. In that case, the job setting table is only required to store user identification information which identifies the user information so as to identify the user information from the user information table.

Returning to FIGS. 1 and 2, the image input unit 10 obtains image data of a original material, a normal original material or a job setting sheet, by using the scanner 160 of the image reading device 100. The image input unit 10 sends instructions for scanning the original material on an auto document feeder tray (ADF tray) to the scanner 160. In response to the instruction, the scanner 160 confirms whether there is a original material on the ADF tray of an auto document feeder (ADF). The scanner 160 then scans the original material and sends the scanned image data to the image input unit 10, if the original material exists on the ADF tray. The scanner 160 sends a signal indicating that there is no original material on the ADF tray to the image input unit 10. The image input unit 10 determines whether the image input unit 10 receives the image data in response to the data received from the scanner. The image input unit 10 continues executing the process if the image data has received. The image input unit 10 terminates the process of the image reading device if the signal has received.

Figure 4:
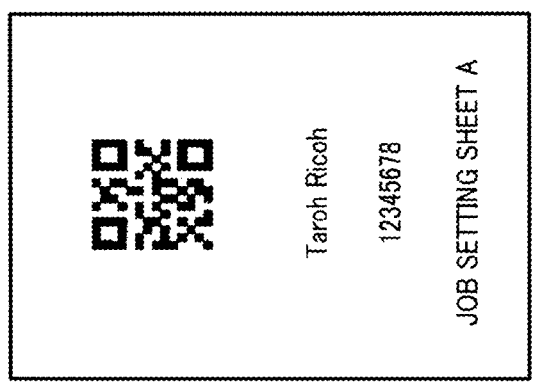
FIG. 4(A) is a diagram showing an exemplary embodiment of a job setting sheet.
FIG. 4(B) to FIG. 4(E) are diagrams showing exemplary embodiments of identification information.

Hereafter, the job setting sheet is explained with reference to FIGS. 4 and 5. FIG. 4(A) is a diagram showing an exemplary embodiment of a job setting sheet. As shown in FIG. 4(A), the job setting sheet is a composite of an independent sheet different from the normal original material, and has printed a two-dimensional code which is a representational image generated by encoding the identification information, a user name whom instructs a job identified by this job setting sheet, a number string indicating a job identification information of the job setting sheet, and a text string indicating the identification information of the job setting sheet. In this form of the job setting sheet, the job setting sheet does not include objects relating to execution of the job on the image reading device 100, because this job setting sheet merely indicates instructions of job setting by the user information and does not include information as to what is to be performed as part of the job.

FIG. 4(B) is a diagram showing an exemplary identification information that is included in the representational image of the job setting sheet. The identification information includes a job identification information that indicates an ID to identify a job to be executed by the image reading device 100, and sheet identification information that indicates a type of the job setting sheet. In the present example, there are two types of job setting sheet: one is a job setting initiation sheet, the other one is a job setting termination sheet. By using the sheet identification information, it can be determined whether the job setting sheet currently scanned is the job setting initiation sheet or the job setting termination sheet.

FIG. 4(C) is a diagram showing a second exemplary identification information. The identification information includes the job identification information, the sheet identification information and a location information that indicates a network location of the job setting table 1502. The identification information can be used for a image reading system by using the job control server 200 (FIG. 2).

FIG. 4(D) is a diagram showing a third exemplary identification information. The identification information includes the job identification information, the sheet identification information and user identification information that identifies user information stored in the user information table 1505. The identification information can be used when the job setting table 1502 does not store the user information.

FIG. 4(E) is a diagram showing a fourth exemplary identification information. The identification information includes the job identification information, the sheet identification information, the location information, the user identification information and user location information that indicates a network location of the user information table 1505. The identification information can be used when using the job control server 200 and when the job setting table 1502 does not store the user information.

Figure 5:
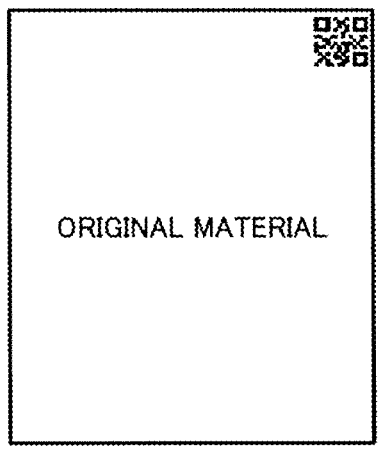
FIG. 5 is a diagram showing an second exemplary embodiment of a job setting sheet.

FIG. 5 is a diagram showing an second exemplary embodiment of job setting sheet. As shown in FIG. 5, the second job setting sheet includes a two-dimensional code on the corner of an original material. In this case, the image data of the original material having a role of the job setting sheet can be an object of the process to be executed by the image reading device 100. The image data of this job setting sheet includes instructions of job settings from the user and image data as an object that identifies the job settings by the identification information of job setting sheet.

Figure 6:
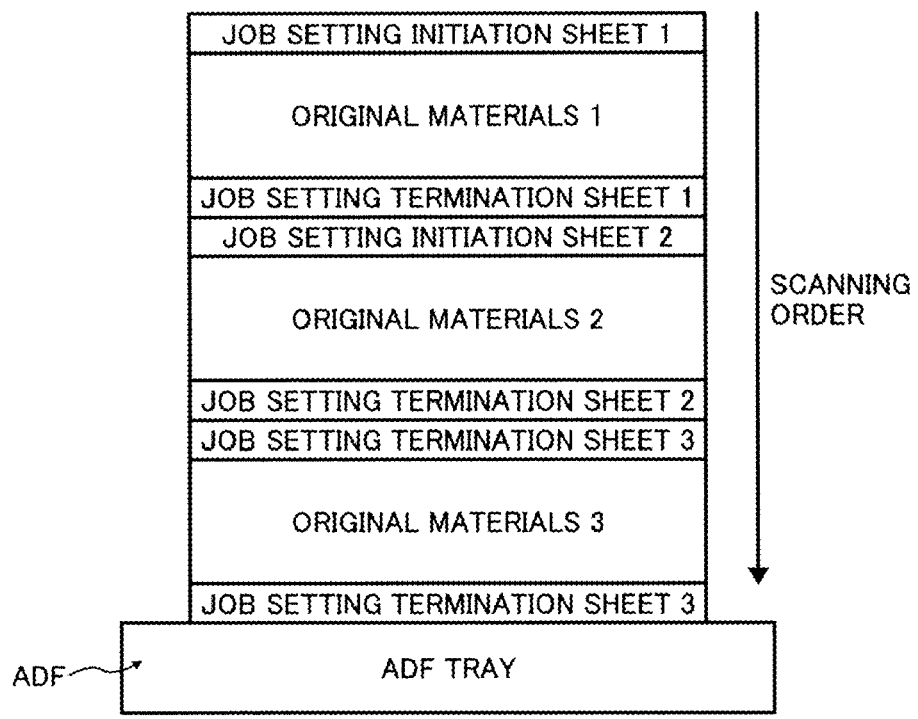
FIG. 6 is a diagram showing an exemplary use of a job setting sheet.

A brief explanation of a use of the job setting sheet is now provided with reference to FIGS. 1-6. FIG. 6 is a diagram showing an exemplary use of the job setting sheet. As shown in FIG. 6, a set of job setting sheets is used to sandwich in any original material(s) to be processed between the job setting initiation sheet and the job setting termination sheet. The original material(s) and the set of job setting sheets are then placed on the ADF tray. The job setting initiation sheet is placed on a top page of the original material(s) to be processed, and the job setting termination sheet is placed below a bottom page of the original material.

Moreover, in case that the identification information is embedded in an original material as shown in FIG. 5, the first page of the original material(s) has a function to play the job setting initiation sheet and the last page of the original material(s) has a function to play the job setting termination sheet.

The paper like medium placed on the ADF tray are read beginning at the top by the scanner 160 (FIGS. 1 and 2). In the example of FIG. 6, the paper like mediums placed on the ADF are read in order from the job setting initiation sheet 1 to the job setting termination sheet 3. The scanner 160 continues scan process until the job setting termination sheet 3 is scanned and no original material is left on the ADF tray. The original material(s) means that there is at least one of the original material to be processed. Therefore the original material(s) does not mean that there has to be more than one original material to be processed.

The identification information extracting unit 20 (FIGS. 1 and 2) extracts the representational image (the two-dimensional code) from the image data input by the image input unit 10. For example, the identification information extracting unit 20 extracts the two-dimensional code as shown in FIG. 4(A) from the image data. The image data can be the first exemplary job setting sheet (FIG. 4(A)) or the second exemplary job setting sheet (FIG. 5).

The identification information obtaining unit 30 receives identification information by decoding the two-dimensional code extracted by the identification information extracting unit 20. The identification information obtaining unit 30 has the image reading device 100 recognize the identification information. As a result of process done by the identification information extracting unit 20 and the identification information obtaining unit 30, a type of the original material can be determined. Namely, if the two-dimensional code does not exist in the image data, it is determined as an original material, and if the two-dimensional code exists in the image data, it is determined whether it is a job setting initiation sheet or a job setting termination sheet based on a sheet identification information included in the identification information.

The job setting obtaining unit 40 obtains the job setting information which corresponds to the job identification information included in the identification information by referring to the job setting table 1502 stored in the storing unit 150 or 210. When the identification information is as FIG. 4(D) or 4(E), the job setting obtaining unit 40 obtains the job setting information which corresponds to the job identification information from the job setting table 1502, and obtains the user information which corresponds to the user identification information included in the identification information from the user information table 1505. As noted above, the job setting table 1502 and the user information table 1505 can be stored in the storing unit 150 or the storing unit 210.

The in-execution job information table control unit 80 controls an in-execution job information table 1503 that stores a in-execution job, which is the job the image reading device 100 is currently running. FIG. 7 is a diagram showing an exemplary embodiment of in-execution job information table 1503. The in-execution job information table 1503 stores only the in-execution job. The in-execution job information table 1503 stores and associates the job identification information, the user information and the job setting information. The in-execution job information table control unit 80 includes the in-execution job confirming unit 801, the interrupting job control unit 802, the in-execution job control unit 803, the in-execution job information table update unit 804, the remaining interrupted job confirming unit 805 and the interrupted job reading unit 806. All of these units are units for controlling the in-execution job information table and they are named according to their respective usage.

The in-execution job confirming unit 801 determines whether there is a current in-execution job by referring to the in-execution job information table 1503. The interrupting job control unit 802 registers a candidate job, the job that executes the job setting information obtained by the job setting obtaining unit 40, as an in-execution job to the in-execution job information table 1503, when the in-execution job confirming unit 801 determines there is the current in-execution job. The in-execution job control unit 803 registers the candidate job as an in-execution job to the in-execution job information table 1503, when the in-execution job confirming unit 801 determines there is no current in-execution job.

The difference between the interrupting job control unit 802 and the in-execution job control unit 803 is whether the process is executed after execution of the interrupted job storing unit 70. The in-execution job information table updating unit 804 updates the in-execution job information table 1503. More specifically, the in-execution job information table updating unit 804 deletes the in-execution job from the in-execution job information table 1503 when the job setting termination sheet is detected. The remaining interrupted job confirming unit 805 determines whether there is remaining interrupted job by referring an interrupted job information table 1506. Then the job executing unit 50 performs the process to the image data by referring to the in-execution job information table 1503.

The interrupted job storing unit 70 stores an interrupted job information concerning the in-execution job to the storing unit 150 and updates the interrupted job information table 1506, when in-execution job is interrupted. The interrupted job information is information that is enough to enable the job executing unit 50 resume the interrupted job, which is a job interrupted by other job while it was executing, after in-execution job is done by the job executing unit 50 by using the interrupted job information. More specifically, the interrupted job information includes a job setting file that includes the job setting of the interrupted job, a job proceeding file that includes the proceeding until interruption is occurred and a job temporary file that includes a intermediate data generated by the interrupted job until the job was interrupted.

FIG. 8 is a diagram showing an exemplary embodiment of the interrupted job information table 1506. The interrupted job information table 1506 stores and associates an INDEX number, the Job ID (the job identification information), a directory, a setting file name, a proceeding file name and a temporary file name.

The INDEX number is a job order information that indicates a waiting number of the interrupted job to be the in-execution job. In this example, the job (Job ID: 123456) having INDEX number 0 is the interrupted job that is to be the in-execution job after current in-execution job has completed. Namely, an interrupted job that has a higher INDEX number indicates there are a higher the number of interrupted jobs that have to have completed until the interrupted job turns to an in-execution job. In other words, the order of waiting until turning into an in-execution job will be slowed whenever the INDEX number increases.

The interrupted job information of the interrupted job stored by the interrupted job storing unit 70 is stored in the interrupted job information table 1506 in a form shown in FIG. 8. The interrupted job information is stored in the interrupted job information table 1506 and is associated with the Job ID. For example, the first row of the interrupted job information table 1506, having the Job ID: 123456, indicates what the setting file, proceeding file, and temporary file are for that particular job (setting file: 123456.def, proceeding file: 123456pgr and temporary file: 0.temp), and where they are stored (in directory/temp/123456).

As shown in FIG. 8, because the interrupted job information table 1506 stores the INDEX number for each interrupted job, the interrupted job storing unit 70 can resume the interrupted job based on the INDEX number even when the interruption of job is duplicated. The interrupted job reading unit 806 reads out the interrupted job information which corresponds to the interrupted job having the smallest INDEX number by referring to the interrupted job information table 1506, and registers the interrupted job as an in-execution job to the in-execution job information table 1503 along with the interrupted job information.

Although the in-execution job information table 1503 and the interrupted job information table 1506 are described as separate tables in the explanation of the present embodiment for the purposes of simplifying the explanation, the in-execution job information table 1503 and the interrupted job information table may be composed together. In that case, there is a way to discriminate the in-execution job and the interrupted job by the INDEX number. For example, a job having INDEX number 0 is in-execution job, other jobs are interrupted jobs.

Moreover, although the present example illustrates a case in which a smaller value is used for the INDEX number as it recorded later in time wise, the numbering of the INDEX number can be performed in the opposite manner. In that case, the job having the greatest INDEX number in the interrupted job information table 1506 is an in-execution job and the job having the second greatest INDEX number is upcoming in-execution job. In the case in which using a table composed of both the in-execution job information table 1502 and the interrupted job information table 1506 is used, either processing from a job having smallest INDEX number or processing from a job having largest INDEX number can be accepted.

The job setting obtaining unit 40 enables the image reading device 100 to cancel a job before executing the job when the job corresponds to a specified Job ID. To cancel the job before beginning to execute the job, the job setting obtaining unit 40 notices a Job ID that identifies the job desired to be cancelled to the storing unit 150 or 210, and then makes a flag, which indicates cancellation of the job has occurred, in the job setting table 1502. The storing unit 150 or 210 notices cancellation of the job if the flag is made by referring to the job setting table 1502, when the job setting obtaining unit 40 requests the storing unit 150 or 210 for the job setting information and user information based on the identification information obtained by the identification information obtaining unit 30. Then, the job executing unit 50 has the scanner 160 eject all the job setting initiation sheet or original material(s) corresponding to the Job ID without executing the job until the job setting termination sheet is detected. These processes enable a cancellation of a job before the job starts being executed by using the job setting obtaining unit 40.

Figure 9:
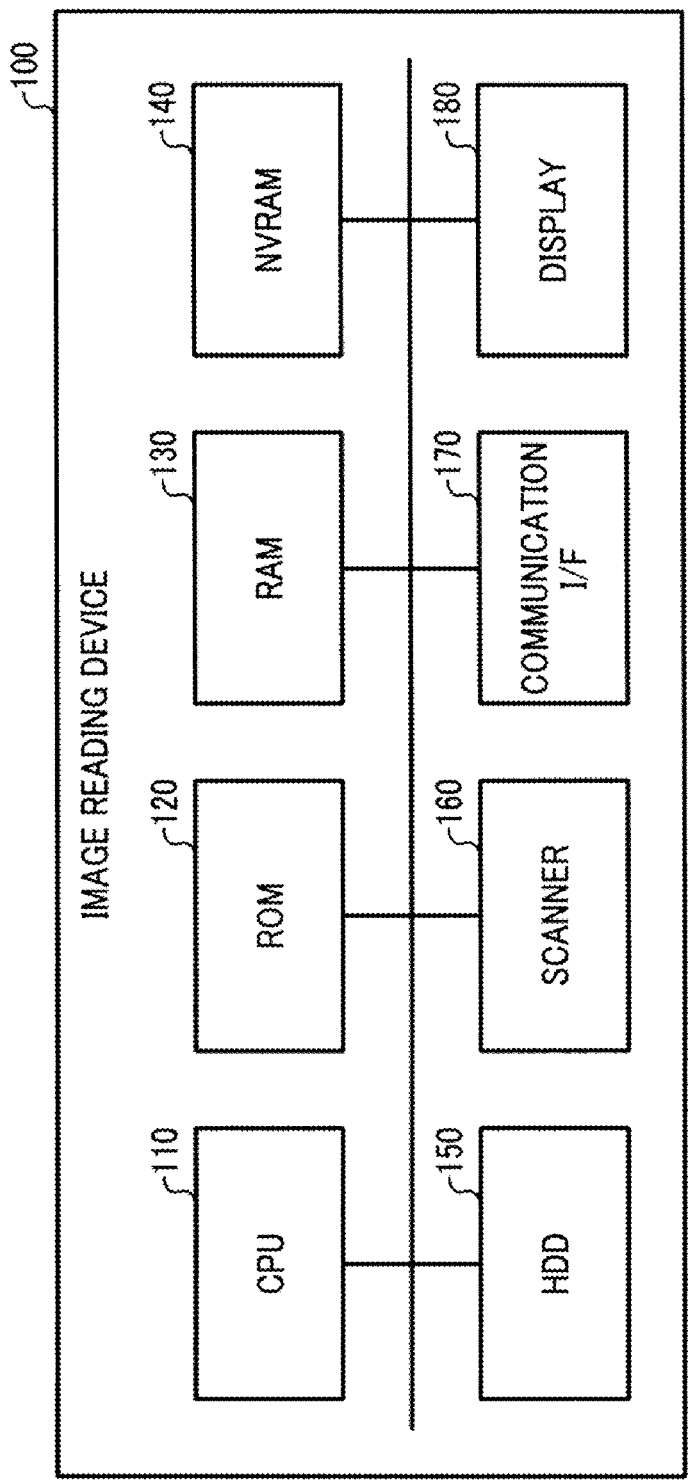
FIG. 9 is a block diagram showing an exemplary hardware construction of the present embodiment.

A brief explanation of a hardware construction of the present embodiment is now provided with reference to FIG. 9. FIG. 9 is a block diagram showing an exemplary hardware construction of the present embodiment. The image reading device 100 includes a CPU (Central Processing Unit) 110, a ROM (Read-Only Memory) 120, a RAM (Random Access Memory) 130, a NVRAM (Non-Volatile RAM) 140, a HDD (Hard Disk Drive) 150, a scanner 160, a communication interface (Communication I/F) 170 and display 180.

The CPU 110 is a device that executes programs stored in the ROM 120. The CPU 110 computes data loaded on the RAM 130 in response to commands from the program and controls the entire image reading device 100. The ROM 120 stores programs and data that are used by the CPU 110. Programs to be executed and data are loaded to the RAM 130. The RAM 130 temporarily stores the computation data while computation is executing. The NVRAM 140 is a semiconductor memory having non-volatility. The NVRAM 140 stores setup information of the image reading device 100. The HDD 150 is a storing device that stores an Operation System (OS), application programs concerning the present embodiment, plug-in applications for function enhancement, or the like, along with relating data. The scanner 160 is a device that scans original material(s) and sends scanned image data to the image reading device 100. The communication I/F 170 is an interface that interacts data, via a network, with other peripheral machines having communication control function. In the present embodiment, the communication I/F 170 connects to a LAN (Local Area Network) and communicates a job setting information and a user information with the job control server 200, also connected to the LAN, pursuant to communication protocol such as TCP/IP (Transmission Control Protocol/Internet Protocol) or the like. The display 180 is a composite of key switches of hardware key and an LCD (Liquid Crystal Display). The display 180 includes functionality to act as a user interface for specifying various settings when a user uses functions that the image reading device 100 has.

The image reading device 100 can also have an external memory unit I/F. The external memory unit I/F is an interface that interacts data with an external memory unit such as USB (Universal Serial Bus) memory, SD card memory or the like. The image reading device 100 can also be formed to read the programs to be executed by the image reading device 100 stored in the external recording medium via the external memory unit I/F and have the CPU execute the programs.

Next, the processes of the image reading device 100 will be explained in relation to the hardware of the image reading device 100. In particular, an explanation is provided for a series of processes that the image reading device 100 executes if a second job is received while a first job is being executed by the image reading device 100. In the present example, the second job is executed by the image reading device 100 prior to finishing first job, and the image reading device 100 resumes the pending first job after the second job is completed so as to complete the first job.

Figure 10:
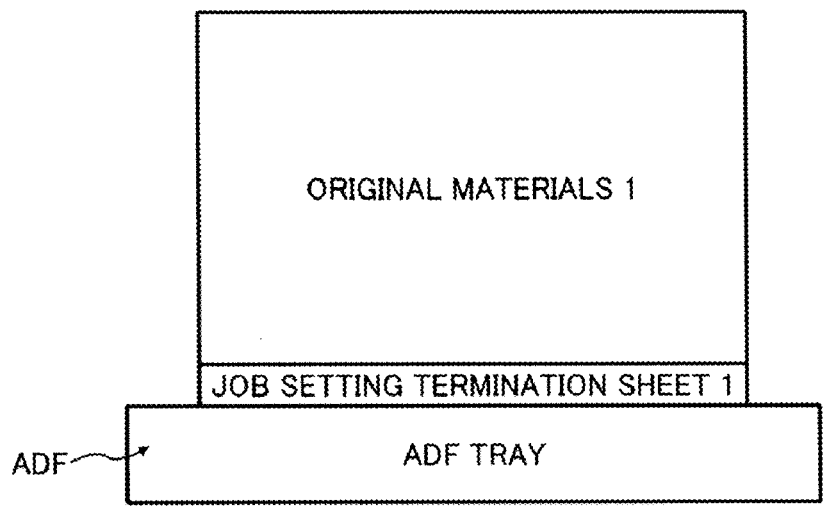
FIG. 10 is a diagram showing a first state in which the image reading device is executing a job.
Figure 11:
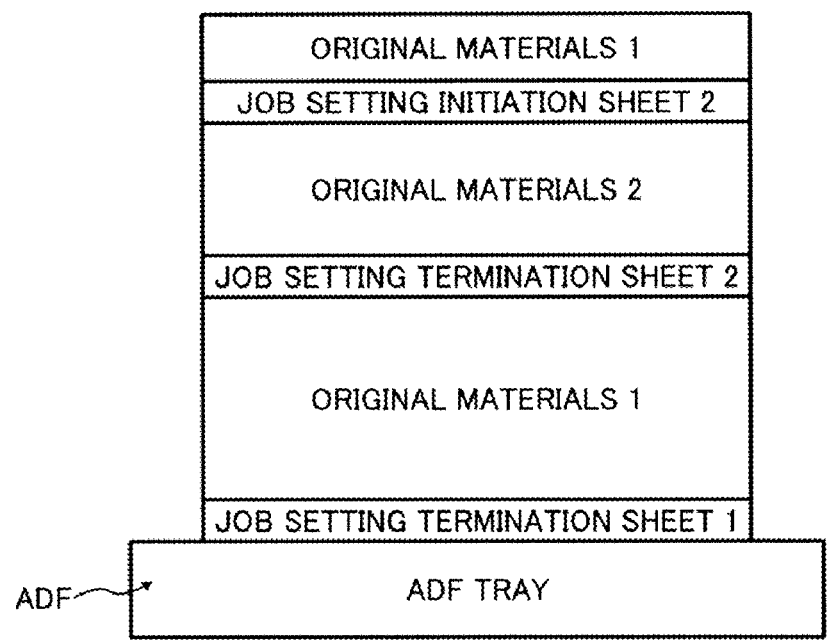
FIG. 11 is a diagram showing a second state in which the image reading device detects an interruption of a job.

In this example, the job setting sheet of FIG. 4(A) is used for specifying the job that the image reading device 100 executes. FIG. 10 is a diagram showing a first state in which the image reading device 100 is executing a job. FIG. 11 is a diagram showing a second state in which the image reading device 100 detects an interruption of a job. An example process of the image reading device 100 is explained using FIG. 10 and FIG. 11, assuming a situation in which the image reading device 100 detects an interruption of a job while the image reading device 100 is executing another job.

First, a series of process that span from detecting a job concerning original material(s) to executing the job is explained. The image input unit 10 (FIGS. 1 and 2) sends an instruction to scan the original material(s) 1 on the ADF tray (FIGS. 10 and 11) to the scanner 160. In response to the instruction, the scanner 160 confirms whether there is original material(s) on an auto document feeder tray (ADF tray) of an auto document feeder (ADF). The scanner 160 then scans the original material and sends the scanned image data to the image input unit 10, if the original material exists on the ADF tray. The image input unit 10 stores the scanned image data to the RAM 130 or HDD 150 of the image reading device 100. The scanner 160 can also send a signal indicating that there is no original material on the ADF tray to the image input unit 10 when no original material exists on the ADF tray. The image input unit 10 terminates the process of the image reading device if the signal has received.

The identification information extracting unit 20 reads out the image data input by the image input unit 10 from the RAM 130 or the HDD 150 and extracts the representational image (the two-dimensional code). The identification information obtaining unit 30 then receives identification information by decoding the two-dimensional code extracted by the identification information extracting unit 20, and stores the identification information to the RAM 130 or the HDD 150. The job setting obtaining unit 40 obtains the job setting information based on the identification information by referring to the job setting table 1502 stored in the storing unit 150 or 210. The obtained job setting information is registered to the in-execution job information table 1503 and stored in the RAM 130 or the HDD 150. The job executing unit 50 executes the job with the image data of the original material(s) based on the job setting registered in the in-execution job information table 1503.

Hereafter, an interruption job concerning an original material(s) 2 will be briefly explained. First, the image input unit 10 sends instruction of scanning the original material on the ADF tray to the scanner 160. In response to the instruction, the scanner 160 confirms whether there is an original material on an auto document feeder tray (ADF tray) of an auto document feeder (ADF). The scanner 160 scans the original material and sends the scanned image data to the image input unit 10, if the original material exists on the ADF tray. The image input unit 10 stores the scanned image data to the RAM 130 or HDD 150 of the image reading device 100.

The scanner 160 sends a signal indicating that there is no original material on the ADF tray to the image input unit 10 when no original material exists on the ADF tray. The image input unit 10 terminates the process of the image reading device if the signal has received. The identification information extracting unit 20 reads out the image data input by the image input unit 10 from the RAM 130 or the HDD 150 and extracts the representational image (the two-dimensional code). The identification information obtaining unit 30 receives identification information by decoding the two-dimensional code extracted by the identification information extracting unit 20, and stores the identification information to the RAM 130 or the HDD 150. The job setting obtaining unit 40 obtains the job setting information based on the identification information by referring to the job setting table 1502 stored in the storing unit 150 or 210. The obtained job setting information is registered to the in-execution job information table 1503 and stored in the RAM 130 or the HDD 150.

The in-execution job information table control unit 80 controls each process according to the in-execution job information table 1503 (such as confirming, updating, setting, or the like) stored in the RAM 130 or the HDD. The in-execution job information table 1503 stores the in-execution job that the image reading device 100 is executing. The interrupted job storing unit 70 stores the interrupted job information of the in-execution job to the RAM 130 or the HDD 150. The interrupted job storing unit 70 updates the interrupted job information table 1506 stored in the RAM 130 or the HDD 150. Then the job executing unit 50 executes the job concerning to the original material(s) 2 based on the job setting registered in the in-execution job information table 1503. Then the interrupted job reading unit 806 reads the interrupted job information concerning the original material(s) 1 (the job setting file, the proceeding file and the temporary file concerning to the original material(s) 1) from the RAM 130 or the HDD 150 and registers them to the in-execution job information table 1503. Then, the job executing unit 50 executes the job concerning the original material(s) 1 based on the job setting registered in the in-execution job information table 1503.

The present embodiment of the present invention enables to provide the image reading device to have a job interrupt without stopping execution of the image reading device and to automatically resume the interrupted job after the interrupting job is completed by these series of process.

Figure 12:
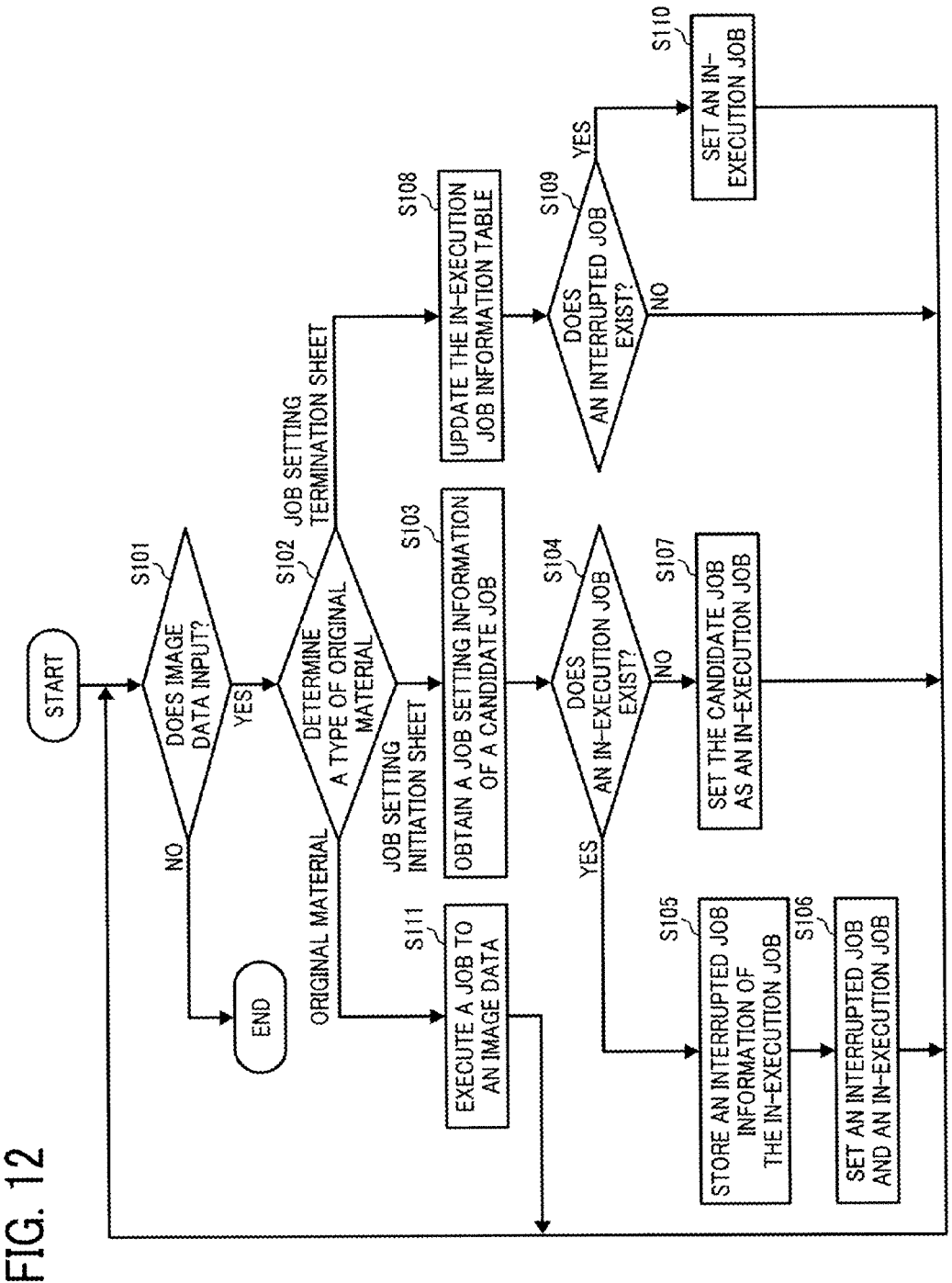
FIG. 12 is a flowchart showing a first exemplary process of the image reading.

An embodiment of the image reading device is explained with reference to FIG. 12. FIG. 12 is a flowchart showing a process of the image reading device of the present first exemplary embodiment. FIG. 11 illustrates a processing run when a second job for original materials 2 interrupts a first job for original materials 1. The original materials shown in FIG. 11 are sequentially read from the upper side to the scanner.

The image reading device 100 starts processing in response to a instruction from a user. The image input unit 10 instructs the scanner 160 to read an original material laid on the automatic document feeder tray. The scanner 160 confirms whether there is an original material on the ADF tray. The scanner scans the original material and sends an image data of the original material to the image input unit 10, if there is an original material on the ADF tray. The scanner sends a signal indicating that no original material is on the ADF tray to the image input unit 10, if there is no original material on the ADF tray.

As can be seen in FIG. 12, the image input unit 10 then determines whether there is an image data input from the scanner 160 (step S101). When the image input unit 10 receives the image data (YES in step S101), the image input unit 10 obtains the image data and proceeds to step S102. When the image input unit 10 receives the signal that indicates that no original material is on the ADF tray (NO in step S101), the image input unit 10 terminates the process of the image reading device 100.

The identification information extracting unit 20 extracts the two-dimensional code from the image data if it exists. The identification information obtaining unit 30 receives identification information by decoding the two-dimensional code extracted by the identification information extracting unit 20. As a result of the processes performed by the identification information extracting unit 20 and the identification information obtaining unit 30, a type of the original material can be determined (step S102). Namely, if the two-dimensional code does not exist in the image data, it is determined as an original material, and if the two-dimensional code exists in the image data, it is determined whether it is a job setting initiation sheet or a job setting termination sheet based on a sheet identification information included in the identification information.

If the image data is determined to be a job setting initiation sheet at step S102, the job setting obtaining unit 40 obtains the job setting information which corresponds to the job identification information included in the identification information by referring to the job setting table 1502 at step S103. In the present disclosure, a job that executes the job setting information obtained by the job setting obtaining unit 40 is called a candidate job.

The in-execution job confirming unit 801 then determines whether there is a current in-execution job, a job that is currently being executed, by referring to the in-execution job information table 1503 (step S104). If the in-execution job confirming unit 801 determines there is a current in-execution job (YES in step S104), the interrupted job storing unit 70 stores a job setting file, a job proceeding file and a job temporary file of the current in-execution job as an interrupted job information to the storing unit 150 and stores the current in-execution job as an interrupted job along with a Job ID, names of the interrupted job information and its directory to the interrupted job information table 1506 with INDEX number 0 (step S105). The interrupting job control unit 802 then registers the candidate job as a in-execution job to the in-execution job information table 1503 (step S106). The process then starts over at step S101. If the in-execution job confirming unit 801 determines there is no current in-execution job (NO in step S104), the in-execution job control unit 803 registers the candidate job as an in-execution job in the in-execution job information table 1503 (step S107). The process then starts over at step S101.

If the image data is determined as a job setting termination sheet at step S102, the in-execution job information table updating unit 804 updates the in-execution job information table 1503 (step S108). More specifically, the in-execution job information table updating unit 804 deletes the in-execution job from the in-execution job information table 1503 when the job setting termination sheet is detected. The remaining interrupted job confirming unit 805 then determines whether there is remaining interrupted job by referring to the interrupted job information table 1506 (step S109). If there is no remaining interrupted job (NO in step S109), the image reading device 100 proceeds back to step S101. If there is a remaining interrupted job (YES in step S109), the interrupted job reading unit 806 reads out the interrupted job information which corresponds to the interrupted job having smallest INDEX number by referring to the interrupted job information table 1506, and registers the interrupted job as an in-execution job in the in-execution job information table 1503 along with the interrupted job information (step S110). The image reading device 100 then proceeds back to step S101.

If, however, the image data is determined to be original material at step S102, the job executing unit 50 performs a designated process on the image data by referring to the in-execution job information table 1503 (step S111). The image reading device 100 then proceeds back to step S101.

The preceding explanation of the behavior of the image reading device 100 was made with reference to a process that uses the job setting sheet described in FIG. 4(A). As another example, the behavior of the image reading device 100 when using the original material described in FIG. 5 will now be explained. Because the basic operating principle of the image reading device 100 has not changed greatly from the above-described embodiment, only changes the process illustrated in the flowchart of FIG. 12 are explained.

In the present example, when it is determined at step S102 that the two-dimensional code exists in the image data read by the image input unit 10, it is then determined, based on the sheet identification information in the identification information, whether the sheet is a job setting initiation sheet, a job setting termination sheet, or both a job setting initiation sheet and a job setting termination sheet.

When it is determined the sheet is a job setting initiation sheet in step S102, the job executing unit 50 executes a process with the image data in response to the in-execution job information by referring to the in-execution job information table 1503 (same as step S111) after the step S106 or step S107. Then, the process of the image reading device 100 returns to step S101.

When it is determined the sheet is a job setting termination sheet in step S102, the job executing unit 50 executes a process with the image data in response to the in-execution job information by referring to the in-execution job information table 1503 (same as step S111) before the process step S108 is executed. Then the process of the image reading device 100 proceeds to step S108.

When it is determined the sheet is both a job setting initiation sheet and a job setting termination sheet in step S102, the image reading device 100 first executes the process of job setting initiation sheet (step S103 through step S107). Then the job executing unit 50 executes a process with the image data in response to the in-execution job information by referring to the in-execution job information table 1503 (same as step S111). Then the process of the image reading device 100 proceeds to step S108. Namely, if the sheet is determined as both the job setting initiation sheet and the job setting termination sheet, the image reading device 100 first executes the process for the job setting initiation sheet, then executes the process done by the job executing unit 50, and executes the process for the job setting termination sheet.

This exemplary embodiment can also be applied to a registration function that registers scanned original material to a file server, a transmission function that transmits scanned original material via mail or fax, and a function that combines the abovementioned function and copying function.

A second exemplary embodiment of the image reading device 100 is now explained. FIG. 11 illustrates a processing run in which a second job for original materials 2 interrupts a first job for original materials 1. As will now be explained, the second embodiment includes a priority determination process of jobs for each of the original materials. Post-process of the determination process will also be explained. Although the priority determination in the second embodiment takes place based on the job setting, the priority determination could be also based on the user information of the users who instructs the jobs for each original materials.

Figure 13:
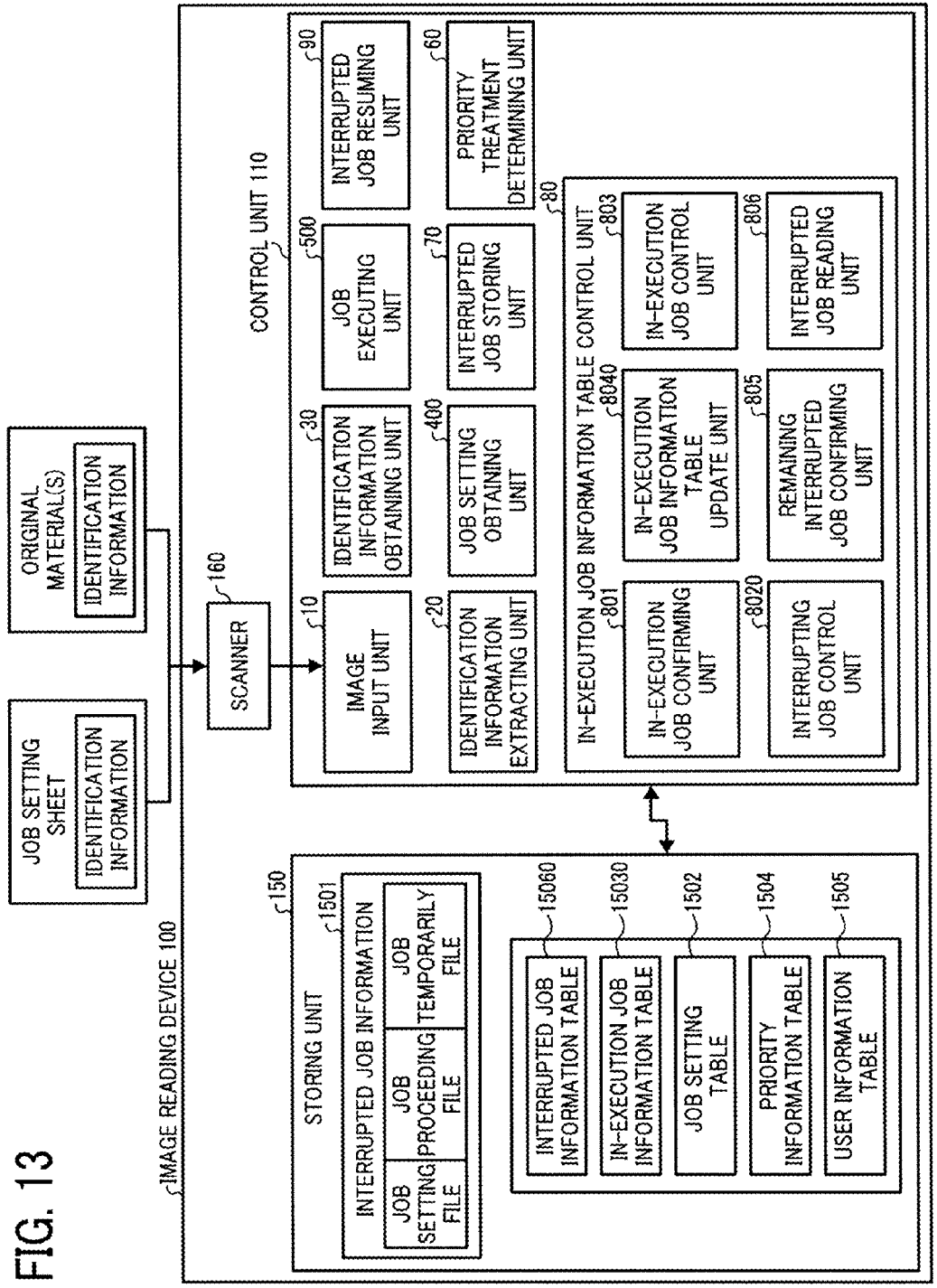
FIG. 13 is a function block diagram showing a second exemplary embodiment of the image reading device.

The original materials shown in FIG. 11 are sequentially read from the upper side to the scanner. FIG. 13 is a function block diagram showing the second exemplary embodiment of the image reading device. The difference between the present exemplary embodiment (FIG. 13) and the first exemplary embodiment (FIGS. 1 and 2) is that a priority treatment determining unit 60, an interrupted job resuming unit 90 and a priority information table 1504 are newly added. These newly added functions affect the job setting obtaining unit 40, the interrupting job control unit 802, the in-execution job information table update unit 804 and the job executing unit 50 illustrated in FIGS. 1 and 2. In particular, these elements are respectively modified and illustrated in FIG. 13 as a job setting obtaining unit 400, a interrupting job control unit 8020, an in-execution job information table update unit 8040 and a job executing unit 500. The in-execution job information table 1503 and the interrupted job information table 1506 illustrated in FIGS. 1 and 2 are also modified and respectively illustrated as an in-execution job information table 15030 and an interrupted job information table 15060 in FIG. 13.

Each of the functions will now be explained based on the function block diagram of FIG. 13. Elements that have the same function as they do in the first exemplary embodiment have the same reference numeral as in FIGS. 1 and 2, and their explanation is omitted in the present example.

The priority treatment determining unit 60 determines a job treatment of the candidate job which is detected while the image reading device 100 executes an in-execution job. The priority treatment determining unit 60 determines the job treatment of the candidate job by referring to the priority information table 1504 stored in the recording unit 150 or 210. The priority information table can be understood with reference to the example priority information tables illustrated in FIG. 14(A) to FIG. 14(C).

A first exemplary form of the priority information table is a priority information table 15041 that defines a priority for each job setting, as shown in FIG. 14(A). The priority treatment determining unit 60 determines the job treatment of the candidate job by comparing the priority of the candidate job to the priority information concerning the job setting of the in-execution job by referring to the priority information table 15041. A second exemplary form of the priority information table is a priority information table 15042 that defines priority for each user, as shown in FIG. 14(B). The priority treatment determining unit 60 determines the job treatment of the candidate job by comparing the priority information concerning the user information of the in-execution job to that of the candidate job by referring to the priority information table 15042. A third exemplary form of the priority information table is a priority information table 15043 that defines priority for each job setting by a user specified degree of urgency, as shown in FIG. 14(C). The priority treatment determining unit 60 determines the job treatment of the candidate job in by comparing the priority information of the candidate job to the priority information concerning the job setting of the in-execution job by referring to the priority information table 15043. In this exemplary embodiment, the priority degree included in the priority information is treated as higher priority if the priority degree is less.

FIG. 16 is a diagram showing a second exemplary embodiment of an interrupted job information table 15060. The interrupted job information table 15060 stores the priority information and the job treatment. By contrast, the interrupted job information table 1506 of the first embodiment, illustrated in FIG. 8, does not store the priority information and the job treatment. Returning to the present example, the priority information is degree of priority that corresponds to Job ID and is obtained from the priority information table 1504. In the following examples, the user priority degree of the priority information table 15042 is used. The priority treatment is a priority treatment determined by the priority treatment determining unit 60.

FIG. 15 is a diagram showing a second exemplary embodiment of an in-execution job information table 15030. The in-execution job information table 15030 stores the priority information and the job treatment. By contrast, the in-execution job information table 1503 of the first embodiment, illustrated in FIG. 7, does not store the priority information and the job treatment.

The job setting obtaining unit 400 obtains the job setting information corresponding to the job setting identification information of the identification information by referring to the job setting table 1502 and the priority information corresponds the obtained job setting by referring to the priority information table 1504. The interrupting job control unit 8020 registers the candidate job as an in-execution job to the in-execution job information table 15030 along with the priority information and the job treatment. The in-execution job information table update unit 8040 then updates the in-execution job information table 15030. The interrupted job resuming unit 90 executes output process of the in-execution job by using the interrupted job information that the interrupted job reading unit 806 read out from the storing unit 150 or 210. The job executing unit 500 stores the image data in response to the job setting information and job treatment of the in-execution job by referring to the in-execution job information table 15030.

The process of the priority treatment determining unit 60 and the interrupted job resuming unit 90 will now be explained in relation to hardware of the image reading device 100. The priority treatment determining unit 60 executes a determining process by referring to the job setting of each job or the user information stored in the RAM 130 or the HDD 150. The interrupted job resuming unit 90 executes output of the in-execution job based on the in-execution job information table 1503 that is set by the interrupted job information that the interrupted job reading unit 806 read. The in-execution job information table 15030 is stored in the RAM 130 or the HDD 150.

Figure 17:
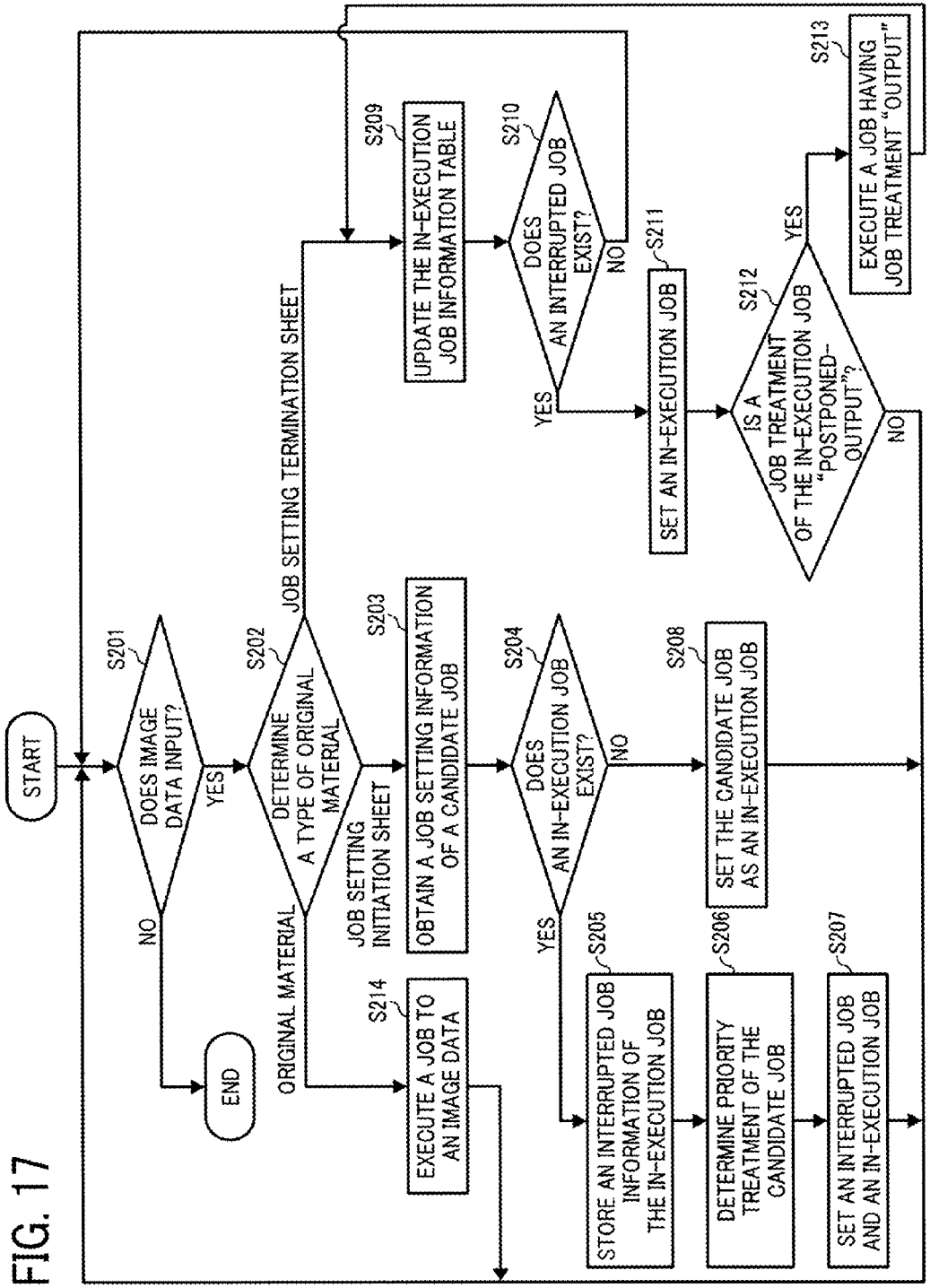
FIG. 17 is a flowchart showing a second exemplary process of the image reading device.

FIG. 17 is a flowchart showing a second exemplary embodiment of the image reading device 100. The explanation for steps S201 and S202 are omitted since they are same as steps S101 and S102 of the first exemplary embodiment (illustrated in FIG. 12).

Following step S201, if the image data is determined as a job setting initiation sheet at step S202, the job setting obtaining unit 400 obtains the job setting information that corresponds to the job identification information included in the identification information by referring to the job setting table 1502 and the priority information concerning the obtained job setting information by referring to the priority information table 1504 (step S203). In the present disclosure, a job that executes the job setting information obtained is referred to as a candidate job.

The in-execution job confirming unit 801 then determines whether there is a current in-execution job, a job is currently executing, by referring to the in-execution job information table 1503 (step S204). If the in-execution job confirming unit 801 determines there is a current in-execution job (YES in step S204), the interrupted job storing unit 70 stores a job setting file, a job proceeding file and a job temporary file of the current in-execution job as an interrupted job information to the storing unit 150 and stores the current in-execution job as an interrupted job along with a Job ID, names of the interrupted job information, priority information, a job treatment, and its directory to the interrupted job information table 15060 with INDEX number 0 (step S205). If the interrupted job has been stored in the interrupted job information table 15060, the interrupted job storing unit 70 adds 1 to all interrupted jobs stored in the interrupted job information table 15060 (step S205).

When the interrupted job storing unit 70 stores the in-execution job in the interrupted job information table 15060 as the interrupted job, the job treatment of the interrupted job is stored according to the following rules: if the job treatment of the in-execution job is "priority", the job treatment of the interrupted job will be "normal"; if the job treatment of the in-execution job "output-postponed" or "refusal", the job treatment of the interrupted job will stay same.

The priority treatment determining unit 60 then determines job treatment of the candidate job (step S206). The priority treatment determination takes place based on a priority information of the in-execution job stored in the in-execution information table 15030 and a priority information of the candidate job obtained from the priority information table 1504. The job treatment as a result of the determining process are three forms such as "priority", "output-postponed" and "refusal". The priority treatment determining unit 60 determines job treatment as "priority" when the priority information of the candidate job is higher than the priority information of the in-execution job. The priority treatment determining unit 60 determines job treatment as "output-postponed" when the priority information of the candidate job is equal to the priority information of the in-execution job. The priority treatment determining unit 60 determines job treatment as "refusal" when the priority information of the candidate job is lower than the priority information of the in-execution job.

In effect, "priority" is a job treatment that the scanning and outputting of the candidate job is executed prior to the in-execution job. "Output-postponed" is a job treatment that only the scanning of the candidate job is executed prior to the in-execution job and the outputting of the candidate job is postponed until the in-execution job is terminated. "Refusal" is a job treatment that refuses interruption of the candidate job. In this case, although the original materials of the candidate job are scanned for detecting the job setting termination sheet of the candidate job, the job to the scanned image data will not take place. The interrupting job control unit 8020 registers the candidate job as an in-execution job to the in-execution job information table 15030 along with the priority information and the job treatment (step S207). The process then proceeds back to step S201.

If the in-execution job confirming unit 801 determines there is no current in-execution job (NO in step S204), the in-execution job control unit 803 registers the candidate job as a in-execution job to the in-execution job information table 1503 (step S208). The process then proceeds back to step S201.

If the image data is determined to be a job setting termination sheet at step S202, the in-execution job information table updating unit 8040 updates the in-execution job information table 15030 (step S209). More specifically, the in-execution job information table updating unit 8040 confirms whether job treatment of the in-execution job is "output-postponed". If the job treatment is "output-postponed", the in-execution job information table updating unit 8040 stores the in-execution job as an interrupted job to the interrupted job information table 15060 with setting INDEX number 1 and job treatment "postponed-output". Namely, the interrupted job is set as a second next job with INDEX number 1 and job treatment "postponed-output". Then the in-execution job information table updating unit 8040 deletes the in-execution job from the in-execution job information table 15030. If the job treatment of the in-execution job is not "output-postponed", the in-execution job information table updating unit 8040 merely deletes the in-execution job from the in-execution job information table.

The remaining interrupted job confirming unit 805 then determines whether there is remaining interrupted job by referring to the interrupted job information table 15060 (step S210). If there is no remaining interrupted job (NO in step S210), the image reading device 100 proceeds back to step S201. If there is a remaining interrupted job (YES in step S210), the interrupted job reading unit 806 reads out the interrupted job information that corresponds to the interrupted job having smallest INDEX number by referring to the interrupted job information table 15060, and registers the interrupted job as an in-execution job to the in-execution job information table 15030 along with the interrupted job information (step S211).

The interrupted job resuming unit 90 then determines the job treatment of the in-execution job is "postponed-output" by referring to the in-execution job information table 15030 (step S212). If the job treatment of the in-execution job is "postponed-output" (YES in step S212), the interrupted job resuming unit 90 executes outputting of the in-execution job by using the interrupted job information which the interrupted job reading unit 806 reads out (step S213). The image reading device 100 then proceeds back to step S209. If the job treatment of the in-execution job is "output" (NO in step S212), the image reading device 100 proceeds directly back to step S201.

If the image data is determined to be an original material at step S202, the job executing unit 500 stores the image data as a temporary file by referring to the in-execution job information table 15030 (step S214). If the job treatment of the in-execution job is "priority", the job executing unit 500 executes the job according to the image data in response to the job setting information of the in-execution job. If the job treatment of the in-execution job is "output-postponed", the job executing unit 500 stores the image data as a temporary file. If the job treatment of the in-execution job is "refusal", the job executing unit 500 disposes the image data without storing. The image reading device 100 then returns to step S201.

The preceding explanation of the behavior of the image reading device 100 was made with reference to a process that uses the job setting sheet described in FIG. 4(A). As another example, the behavior of the image reading device 100 when using the original material described in FIG. 5 will now be explained. Because the basic operating principle of the image reading device 100 has not changed greatly from the above-described embodiment, only changes the process illustrated in the flowchart of FIG. 17 are explained.

In the case in which the two-dimensional code exists in the image data read by the image input unit 10 in step S202, it is then determined, based on the sheet identification information in the identification information, whether the sheet is a job setting initiation sheet, a job setting termination sheet, or both a job setting initiation sheet and a job setting termination sheet.

In the case in which the sheet is determined to be a job setting initiation sheet in step S202, the job executing unit 50 executes a process with the image data in response to the in-execution job information by referring to the in-execution job information table 15030 (same as step S214) after the step S207 or step S208. Then the process of the image reading device 100 returns to step S201.

In the case in which the sheet is determined to be a job setting termination sheet in step S202, the job executing unit 50 executes a process with the image data in response to the in-execution job information by referring to the in-execution job information table 15030 (same as step S214) before the process step S209 is executed. Then the process of the image reading device 100 proceeds to step S209.

In the case in which the sheet is determined to be both a job setting initiation sheet and a job setting termination sheet in step S202, the image reading device 100 first executes the process of job setting initiation sheet (step S203 through step S205, step S208, step S206 and step S207). Then the job executing unit 50 executes a process with the image data in response to the in-execution job information by referring to the in-execution job information table 15030 (same as step S214). Then the process of the image reading device 100 proceeds to step S209. Namely, if the sheet is determined as both the job setting initiation sheet and the job setting termination sheet, the image reading device 100 first executes the process for the job setting initiation sheet, then executes the process done by the job executing unit 50, and executes the process for the job setting termination sheet.

This exemplary embodiment also can be applied to a registration function that registers scanned original material to a file server, a transmission function that transmits scanned original material via mail or fax, and a function that combines the abovementioned functions and copying function.

Figure 18:
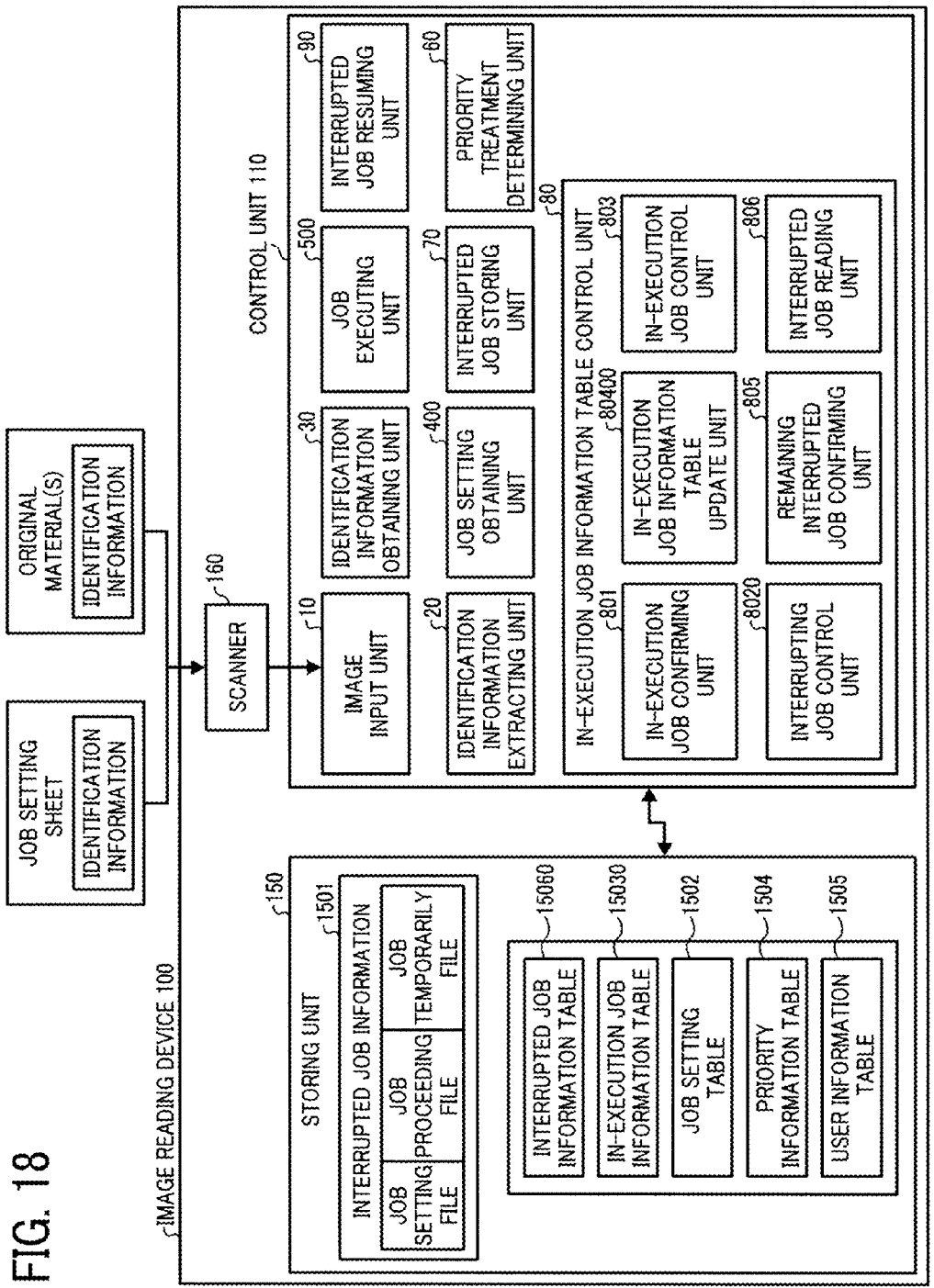
FIG. 18 is a function block diagram showing a third exemplary embodiment of the image reading device.

A third exemplary embodiment of the image reading device 100 will be explained next. FIG. 18 is a function block diagram showing the third exemplary embodiment of the image reading device 100. The difference between the present example and the second exemplary embodiment is that the in-execution job information table update unit 8040 is modified to an in-execution job information table update unit 80400. The functions of this element will now be explained with reference to the function block diagram of FIG. 18. Elements that have the same function as they do in the second exemplary embodiment have the same reference numeral as in FIG. 13, and their explanation is omitted in the present example. The in-execution information table 80400 updates the in-execution job information table 15030 and notices completion of the in-execution job to the user.

Figure 19:
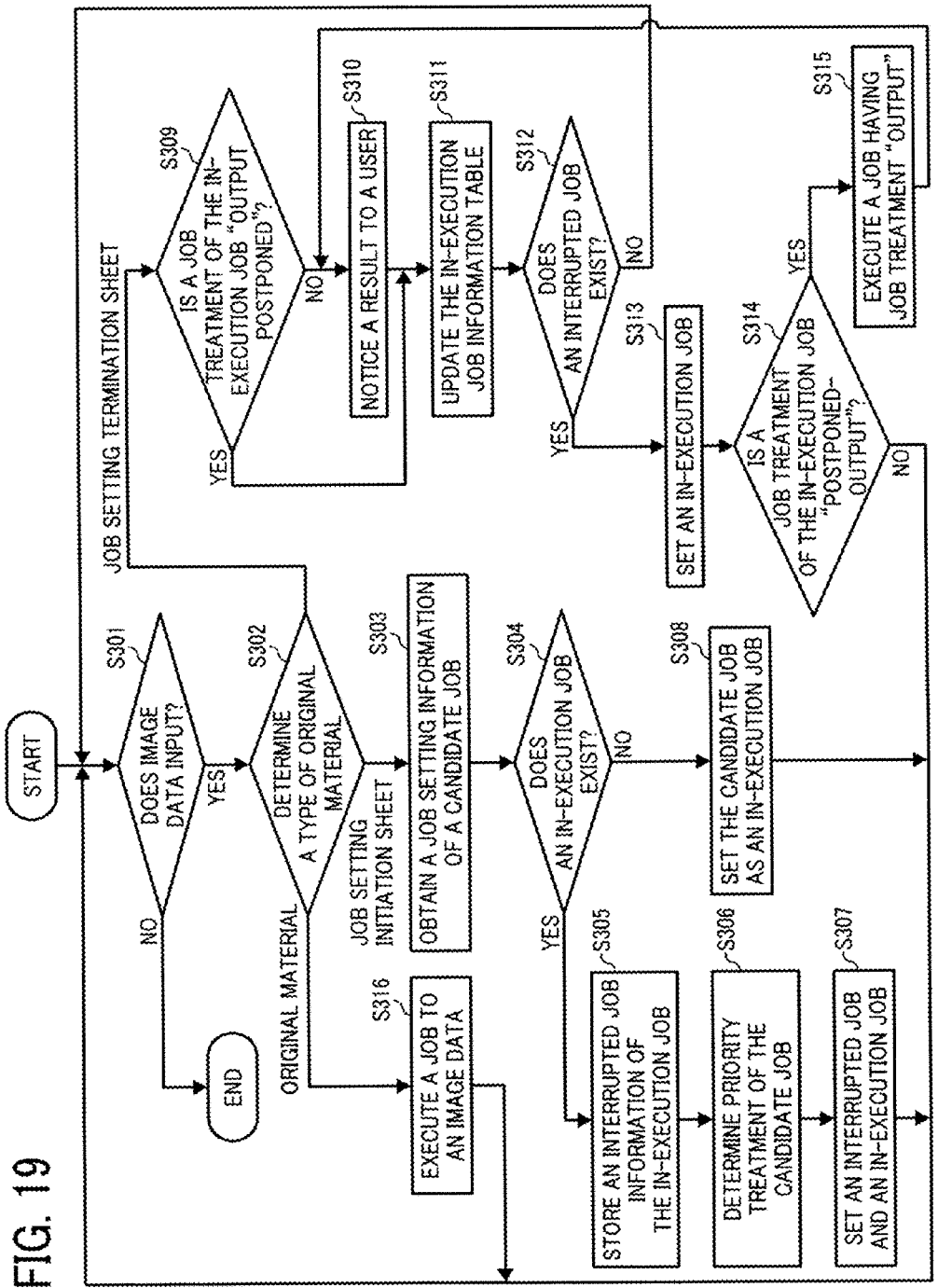
FIG. 19 is a flowchart showing a third exemplary process of the image reading device.

FIG. 19 is a flowchart showing a third exemplary process of the image reading device. The difference between the second exemplary embodiment and the present example is a process when the type of original materials is determined as a job setting termination sheet. Therefore the explanation for other processes are omitted. In particular, the explanations for steps S301 to S308 are omitted since they are same as steps S201 and S208 of the second exemplary embodiment (illustrated in FIG. 17). Likewise, step S316 in FIG. 19 is the same as step S214 in FIG. 17.

Referring now to FIG. 19, if the image data is determined as a job setting termination sheet at step S302, the in-execution job information table updating unit 80400 determines whether job treatment of the in-execution job is "output-postponed" (step S309). If it is determined as "output-postponed" (YES in step S309), the in-execution job information table updating unit 80400 stores the in-execution job to the interrupted job information table 15060 as an interrupted job with setting INDEX number 1 and job treatment "postponed-output". Namely, the interrupted job is set as a second next job with INDEX number 1 and job treatment "postponed-output". Then image reading device 100 proceeds to step S311. If, however, the job treatment of the in-execution job is not "output-postponed" (NO in step S309), the in-execution job information table updating unit 80400 notices completion of the in-execution job to the user by using the in-execution job information table 15030 (step S310). The image reading device 100 then proceeds to step S311.

The in-execution job information table updating unit 80400 then updates the in-execution job information table 15030 (step S311). More specifically, the in-execution job information table updating unit 80400 deletes the in-execution job from the in-execution job information table. The remaining interrupted job confirming unit 805 then determines whether there is a remaining interrupted job by referring to the interrupted job information table 15060 (step S312). If there is no remaining interrupted job (NO in step S312), the image reading device 100 proceeds back to step S301. If there is a remaining interrupted job (YES in step S312), the interrupted job reading unit 806 reads out the interrupted job information which corresponds to the interrupted job having smallest INDEX number by referring to the interrupted job information table 15060, and registers the interrupted job as an in-execution job to the in-execution job information table 15030 along with the interrupted job information (step S313).

The interrupted job resuming unit 90 then determines whether the job treatment of in-execution job is "postponed-output" by referring to the in-execution job information table 15030 (step S314). If the job treatment of the in-execution job is "postponed-output" (YES in step S2314), the interrupted job resuming unit 90 executes outputting of the in-execution job by using the interrupted job information which the interrupted job reading unit 806 reads out (step S315). The image reading device 100 then proceeds back to step S310. If the job treatment of the in-execution job is "postponed-output" (NO in step S314), the image reading device 100 proceeds back to step S101.

The preceding explanation of the behavior of the image reading device 100 was made with reference to a process that uses the job setting sheet described in FIG. 4(A). As another example, the behavior of the image reading device 100 when using the original material described in FIG. 5 will now be explained. Because the basic operating principle of the image reading device 100 has not changed greatly from the above-described embodiment, only changes the process illustrated in the flowchart of FIG. 19 are explained.

In the case in which the two-dimensional code exists in the image data read by the image input unit 10 in step S302, it is determined, based on the sheet identification information in the identification information, whether the sheet is a job setting initiation sheet, a job setting termination sheet, or both a job setting initiation sheet and a job setting termination sheet.

In the case in which the sheet is determined to be a job setting initiation sheet in step S302, the job executing unit 50 executes a process with the image data in response to the in-execution job information by referring to the in-execution job information table 15030 (same as step S206) after the step S307 or step S308. Then the process of the image reading device 100 returns to step S301.

In the case in which the sheet is determined to be a job setting termination sheet in step S302, the job executing unit 50 executes a process with the image data in response to the in-execution job information by referring to the in-execution job information table 15030 (same as step S316) before the process step S301 is executed. Then the process of the image reading device 100 proceeds to step S309.

In the case in which the sheet is determined to be both a job setting initiation sheet and a job setting termination sheet in step S302, the image reading device 100 first executes the process of job setting initiation sheet (step S303 through step S305, step S308, step S306 and step S307). Then the job executing unit 50 executes process to the image data in response to the in-execution job information by referring to the in-execution job information table 15030 (same as step S316). Then the process of the image reading device 100 proceeds to step S309. Namely, if the sheet is determined as both the job setting initiation sheet and the job setting termination sheet, the image reading device 100 first executes the process for the job setting initiation sheet, then executes the process done by the job executing unit 50, and executes the process for the job setting termination sheet.

This exemplary embodiment also can be applied to a registration function that registers scanned original material to a file server, a transmission function that transmits scanned original material via mail or fax, and a function that combines the abovementioned function and copying function.

In the above described examples, an image reading device that can automatically set a job to be performed by scanning a job setting sheet or an original material that includes identification information on the original material. The image reading device can also automatically execute interrupting job, automatically resume an interrupted job and then complete the interrupted job.

Although, an image reading device is explained in the abovementioned explanation, a method for executing its image reading and a computer readable recording medium storing image reading program that executes the image reading method by a computer are also within a technical scope of the present invention. The image reading program stored in the recording medium is read by the image reading device, and is executed by the image reading device.

Obviously, numerous modifications and variations of the present invention are possible in light of the above teachings. It is therefore to be understood that within the scope of the appended claims, the invention may be practiced otherwise than as specifically described herein.

The invention claimed is:
1. An image reading device comprising:
a storage unit configured to store information;
an image input unit configured to obtain image data;
an interrupted job storage unit that is configured to interrupt a first job when a job setting initiation sheet that indicates an initiation of a second job is received while the first job is being executed, and that is configured to store an interrupted job information that relates to the first job in the storage unit when the job setting initiation sheet is received;
an interruption job confirmation unit configured to set the second job as an in-execution job when the job setting initiation sheet is received;
an interrupted job reading unit that is configured to read the interrupted job information that relates to the first job from the storage unit when a job setting termination sheet that indicates a termination of the second job is received, and that is configured to set the first job as the in-execution job when the job setting termination sheet is received;

a job execution unit configured to execute the in-execution job with the image data obtained from the image input unit; and a second storage unit configured to store an interrupted job information table that stores job order information of the first job, wherein the interrupted job storage unit is configured to store the interrupted job to the interrupted job information table, and wherein the interrupted job reading unit is configured to determine whether the first job is to be read out from the interrupted job storage unit by referring to the job order information of the first job in the interrupted job information table when the job setting termination sheet is received, and is configured to read out the interrupted job information that relates to the first job from the storage unit when the interrupted job reading unit determines the first job is to be read out.

2. The image reading device as claimed in claim 1, wherein the interrupted job information table further stores location information that indicates a location where the interrupted job information that relates to the first job is stored, and wherein the interrupted job reading unit is configured to read out the interrupted job information that corresponds to the first job from the storage unit based on the location information.

3. The image reading device as claimed in claim 1, further comprising:

a third storage unit configured to store a job setting table that stores job setting information that includes job setting information of each of the first job and the second job;

a job setting obtaining unit configured to obtain the job setting information of the second job when the job setting initiation sheet is received; and a fourth storage unit configured to store an in-execution job information table that stores a job setting information of the in-execution job, wherein the interruption job confirmation unit is configured to set the second job as the in-execution job by storing the job setting information of the second job in the in-execution job information table, and wherein the job execution unit is configured to execute the in-execution job with the image data obtained by the image input unit based on the job setting information of the in-execution job information table.

4. The image reading device as claimed in claim 3, further comprising:

a fifth storage unit configured to store a priority information table that stores predetermined priority information of each of the first job and the second job; and a priority treatment determining unit configured to determine a job treatment of the second job based on the priority information of the first job and the second job, wherein the in-execution job information table is configured to store a job treatment of the in-execution job, wherein the job setting obtaining unit is configured to obtain the priority information of the second job based on the job setting initiation sheet, wherein the interruption job confirmation unit is configured to store the job treatment of the second job in the in-execution job information table, and wherein the job execution unit is configured to execute the in-execution job with the image data obtained by the image input unit based on the job setting information and the job treatment stored in the in-execution job table.

5. The image reading device as claimed in claim 4, further comprising a remaining interrupted job unit that is configured to determine whether there is a remaining interrupted job by referring to the interrupted job information table, wherein the job execution unit is configured to update the in-execution job information table when the in-execution job is completed by deleting the in-execution job from the in-execution job information table, and wherein if the remaining interrupted job unit determines there is at least one remaining interrupted job in the interrupted job information table after the job execution unit updates the in-execution job information table by deleting the in-execution job from the in-execution job information table, the interrupted job reading unit reads out one of the at least one remaining interrupted jobs from the storage unit.

6. The image reading device as claimed in claim 5, wherein the at least one remaining interrupted job is read from the storage unit based on an index number of the at least one remaining interrupted job that is stored in the interrupted job information table.

7. An image reading method comprising:

obtaining image data with an image input unit of an image reading device;

interrupting execution of a first job when a job setting initiation sheet that indicates an initiation of a second job is received by the image reading device while the first job is being executed by the image reading device;

storing an interrupted job information that relates to the first job in a storage unit;

setting the second job as an in-execution job in the image reading device when the job setting initiation sheet is received by the image reading device;

executing the in-execution job in the image reading device with the image data obtained from the image input unit;

reading the interrupted job information that relates to the first job from the storage unit when a job setting termination sheet that indicates a termination of the second job is received by the image reading device;

setting the first job as the in-execution job in the image reading device; and storing an interrupted job information table that stores job order information of the first job, wherein the storing the interrupted job information storing includes storing the first job to the interrupted job information table, and wherein the reading the interrupted job information includes determining whether to read out the first job from the storage unit by referring to the job order information of the first job in the interrupted job information table when the job setting termination sheet is received by the image reading device.

8. The image reading method as claimed in claim 7, wherein the interrupted job information table further stores a location information that indicates a location where the interrupted job information that relates to the first job is stored, and wherein the reading the interrupted job information reads out the first job based on the location information.

9. The image reading method as claimed in claim 7, further comprising:

storing a job setting table that stores job setting information that includes job setting information of each of the first job and the second job;

obtaining the job setting information of the second job when the job setting initiation sheet is received; and storing an in-execution job information table that stores a job setting information of the in-execution job, wherein the setting the second job as the in-execution job is executed by storing the job setting information of the second job in the in-execution job information table, and wherein the executing the in-execution job executes the in-execution job based on the job setting information of the in-execution job information table.

10. The image reading method as claimed in claim 9, further comprising:

storing a priority information table that stores predetermined priority information of each of the first job and the second job; and determining a job treatment of the second job based on the priority information of the first job and the second job, wherein the in-execution job information table further stores the job treatment of the in-execution job, wherein the obtaining the job setting information further obtains the priority information relating to the second job based on the job setting initiation sheet, wherein the setting the second job as the in-execution job includes storing the job treatment of the second job in the in-execution job information table, and wherein the executing the in-execution job includes executing the in-execution job based on the job setting information and the job treatment stored in the in-execution job table.

11. The image reading device as claimed in claim 10, further comprising:

updating the in-execution job information table when the in-execution job is completed by deleting the in-execution job from the in-execution job information table;

determining whether there is a remaining interrupted job after the job execution unit updates the in-execution job information table by referring to the interrupted job information table; and reading out at least one remaining interrupted job from the storage unit if the remaining interrupted job unit determines there is at least one remaining interrupted job in the interrupted job information table.

12. The image reading device as claimed in claim 11, wherein the at least one remaining interrupted job is read from the storage unit based on an index number of the at least one remaining interrupted job that is stored in the interrupted job information table.

13. An image reading device comprising:

a storage unit configured to store information;

an image input unit configured to obtain image data;

an interrupted job storage unit that is configured to interrupt a first job when a job setting initiation sheet that indicates an initiation of a second job is received while the first job is being executed, and that is configured to store an interrupted job information that relates to the first job in the storage unit when the job setting initiation sheet is received;

means for setting the second job as an in-execution job when the job setting initiation sheet is received;

means for reading the interrupted job information that relates to the first job from the storage unit when a job setting termination sheet that indicates a termination of the second job is received, and for setting the first job as the in-execution job when the job setting termination sheet is received;

a job execution unit configured to execute the in-execution job with the image data obtained from the image input unit; and a second storage unit configured to store an interrupted job information table that stores job order information of the first job, wherein the interrupted job storage unit is configured to store the interrupted job to the interrupted job information table, and wherein the means for reading the interrupted job information determines whether the first job is to be read out from the interrupted job storage unit by referring to the job order information of the first job in the interrupted job information table when the job setting termination sheet is received, and reads out the interrupted job information that relates to the first job from the storage unit when the interrupted job reading unit determines the first job is to be read out.

14. The image reading device as claimed in claim 13, wherein the interrupted job information table further stores a location information that indicates a location where the interrupted job information that relates to the first job is stored, and wherein means for reading the interrupted job information reads out the interrupted job information that corresponds to the first job from the storage unit based on the location information.

15. The image reading device as claimed in claim 13, further comprising:

a third storage unit configured to store a job setting table that stores job setting information that includes job setting information of each of the first job and the second job;

means for obtaining job setting information of the second job when the job setting initiation sheet is received; and a fourth storage unit configured to store an in-execution job information table that stores a job setting information of the in-execution job, wherein the means for setting the second job as the in-execution job sets the second job as the in-execution job by storing the job setting information of the second job in the in-execution job information table, and wherein the job execution unit is configured to execute the in-execution job with the image data obtained by the image input unit based on the job setting information of the in-execution job information table.

16. The image reading device as claimed in claim 15, further comprising:

a fifth storage unit configured to store a priority information table that stores predetermined priority information of each of the first job and the second job;

means for determining a job treatment of the second job based on the priority information of the first job and the second job, wherein the in-execution job information table is configured to store a job treatment of the in-execution job;

means for obtaining job setting information of the second job obtains the priority information of the second job based on the job setting initiation sheet; and means for setting the second job as an in-execution job stores the job treatment of the second job in the in-execution job information table, wherein the job execution unit is configured to execute the in-execution job with the image data obtained by the image input unit based on the job setting information and the job treatment stored in the in-execution job table.

17. The image reading device as claimed in claim 16, further comprising means for determining whether there is a remaining interrupted job by referring to the interrupted job information table, wherein the job execution unit is configured to update the in-execution job information table when the in-execution job is completed by deleting the in-execution job from the in-execution job information table, and wherein if means for determining whether there is the remaining interrupted job determines there is at least one remaining interrupted job in the interrupted job information table after the job execution unit updates the in-execution job information table by deleting the in-execution job from the in-execution job information table, the means for reading the interrupted job information reads out one of the at least one remaining interrupted jobs from the storage unit.

* * * * *